March 27, 1928.

R. F. KATOLIN

GRADE INDICATOR

Filed May 1, 1926

Inventor
Rudolf F. Katolin
By
Attorney

March 27, 1928.

R. F. KATOLIN

GRADE INDICATOR

Filed May 1, 1926

Inventor
Rudolf F. Katolin

By L. N. Gilley

Attorney

Patented Mar. 27, 1928.

1,664,365

UNITED STATES PATENT OFFICE.

RUDOLF F. KATOLIN, OF LOS ANGELES, CALIFORNIA.

GRADE INDICATOR.

Application filed May 1, 1926. Serial No. 106,169.

This invention relates to measuring instruments and has special reference to a grade indicator for measuring the grade of the terrain over which a motor car or other vehicle is traveling.

One important object of this invention is to provide an improved and simple device of this character adapted to be attached to the instrument board of an automobile or the like and which will present to the operator's eye an accurate indication of grade of the particular piece of road or the like over which the automobile may be traveling or on which it is standing.

A second important object of the invention is to provide an improved device of this description having means whereby it may be adjusted to suit the particular inclination of the instrument board to which it is applied.

A third important object of the invention is to provide an improved adjustable damping means for an instrument of this class, the means being so arranged that apparent variations in grade such as are caused by roughnesses in the road over which the vehicle is moving will not be indicated. In other words, the improved damping means prevents constant oscillation of the indicating needle, forming part of the instrument, while the vehicle is in motion over a road or the like.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
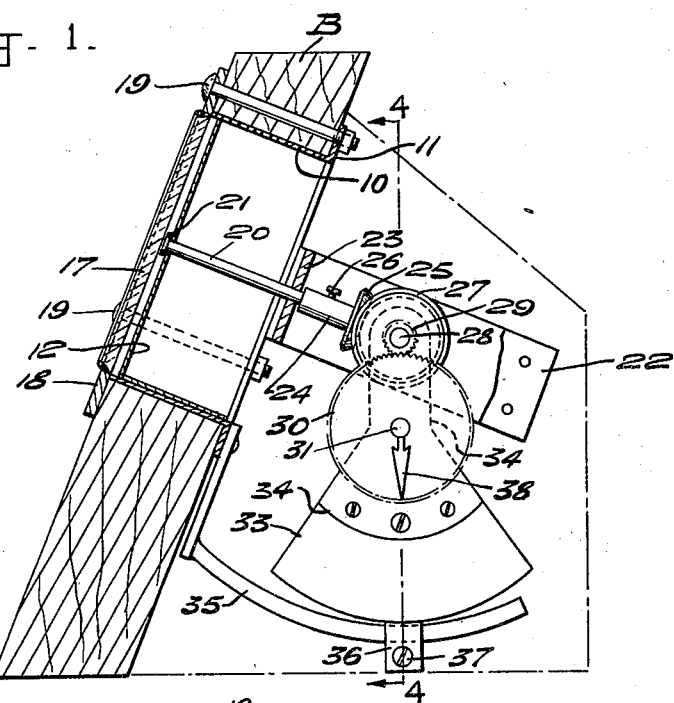
Figure 1 is a cross section through a portion of an instrument board showing the instrument applied thereto, the dust cover being indicated in dotted lines.
Figure 2:
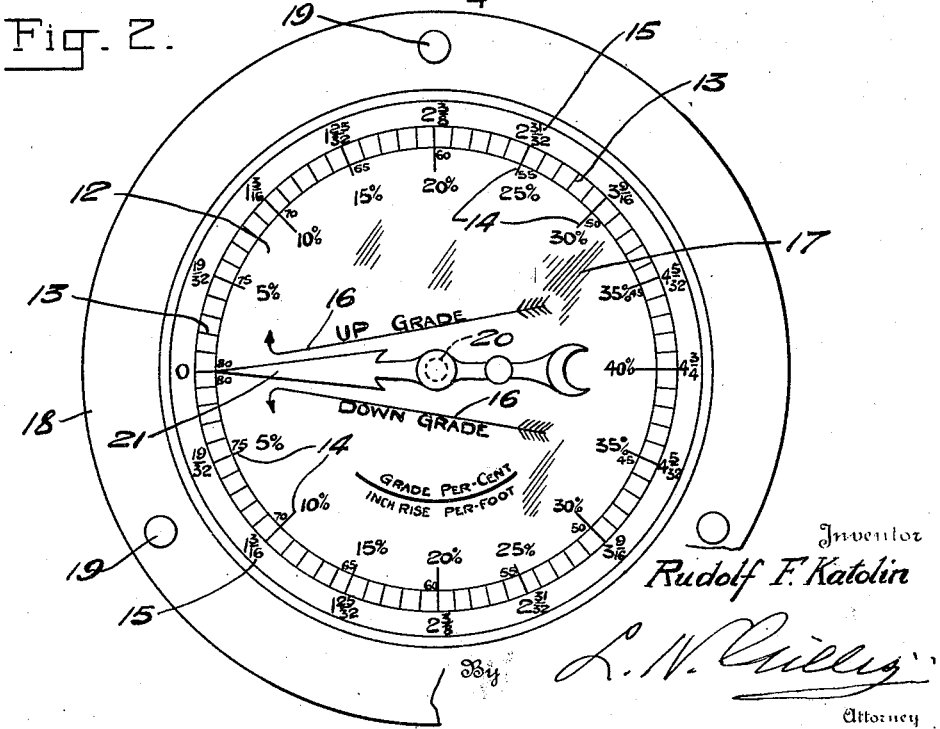
Figure 2 is a face of the dial and indicating needle or hand.
Figure 3:
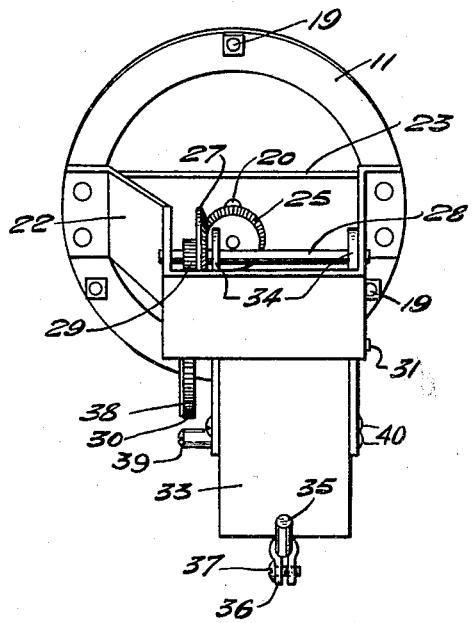
Figure 3 is an elevation taken from the right hand side of Figure 1.
Figure 4:
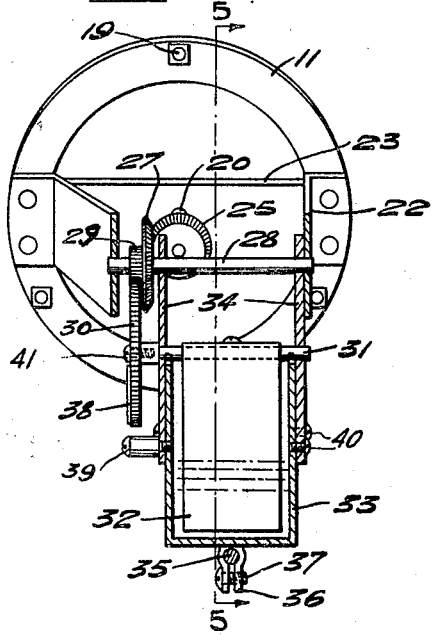
Figure 4 is a section on the line 4—4 of Figure 1.
Figure 5:
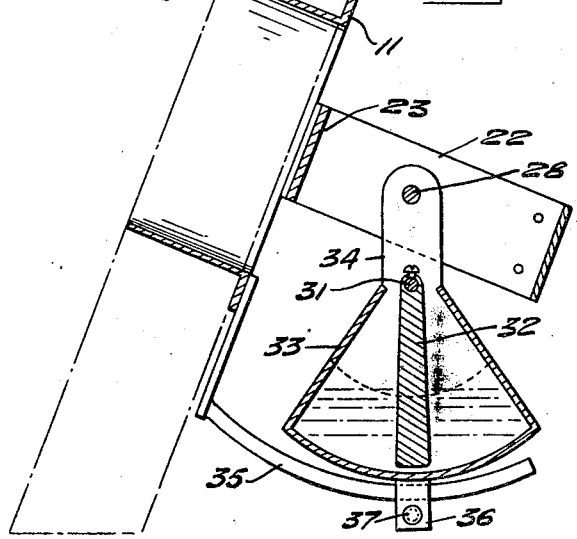
Figure 5 is a detail section on the line 5—5 of Figure 4.

In order to illustrate the invention there has been shown in the drawings a portion B of an instrument board and this portion is provided with a suitable opening for the reception of a cylindrical lining 10 having a flange 11 at the back end which rests against the back face of the board B. At the front end of this casing there is provided a dial plate 12 on which is a circular scale 13 divided by units both ways from 0% to 40% suitable indicia 14 being provided at each fifth division. Outside of the scale are other indicia 15 indicating the rise in inches per foot of horizontal distance. Also "Up grade" and "Down grade" indicia 16 are provided on this dial. Over this dial is a glass 17 which is held in position by a bezel ring 18, bolts 19 passing through the flange 11, the board B and ring 18 to secure all parts just described firmly in position on the board.

The dial is provided with a central opening forming a bearing for a shaft 20 which projects through the dial and carries on its forward end a pointer or hand 21. Secured to the flange 11 is a frame 22 of general U-shape and connecting the legs of this frame is a strap 23 wherein is an opening through which the rear portion of the shaft 20 passes, this opening thus forming a rear bearing for the shaft. Mounted on the rear end of the shaft 20 is a sleeve 24 carrying a bevel gear 25, the sleeve being secured in adjusted position on the shaft by a screw 26. This gear meshes with a bevel gear 27 which turns on a shaft 28 fixed in the frame 22. On the gear 27 is also fixed a pinion 29 which meshes with a large gear 30 mounted on shaft 31 having a plumb pendulum 32 also fixed thereon. This pendulum dips into a segment of a cylindrical tank 33 having a bottom concentric with the shaft 28 and is provided with arms 34 by which it is hung from said shaft, these arms having the shaft 31 journalled therein. It will be noted that the pendulum is slightly less in width than the tank so that the proximity of the tank sides and bottom provides only narrow spaces around the sides and bottom of the pendulum through which the heavy oil, or other liquid having a considerable degree of viscosity, with which the tank is partly filled, may flow. This arrangement effectually slows down the motion of the pendulum in the tank and prevents minor oscillations of the vehicle from injuriously affecting the reading of the instrument.

Gear 30 slides off shaft 31 for adjusting, by loosening screw 41.

In order to adjust the tank so that its center will lie vertically below the axis of the shaft 28 upon the vehicle being on a level there is secured to the flange 11 a bracket supporting an arc bar 35 concentric to the shaft 28 and on the bottom of the tank is a split guide 36 through which the arc bar passes, the sides of the guide being adapted to be drawn together by the screw 37 so that the tank may be fixed in position on the bar. A pointer 38 on the shaft 31 serves to assist in properly positioning the tank. To remove tank, take out oil-plug 39 screws 40 and 37.

It is, of course, to be understood that the proportions of the various gears are such that one degree of angular movement of the pendulum will be accompanied by a corresponding movement of the hand over the dial scale. I do not, however, wish to restrict the invention to any particular sizes or proportions of these gears since with some instruments the scale range may be more or less than 40 degrees and corresponding changes in the gearing would be made to effect proper indications on such scales.

In use the instrument is fixed to the instrument board, the hand adjusted to read 0 when the vehicle is on level ground and the tank properly positioned vertically below the shaft 28. Then, as the vehicle takes an inclined position on any grade the grade percentage and rise in inches per foot may be directly read from the scale.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a grade indicator, a dial having grade indicia thereon a pointer traversing the grade indicia, a shaft having said pointer fixed thereon, a plumb pendulum, gearing connecting the pendulum and shaft, a pivotally supported tank having a viscous liquid therein into which the pendulum dips, an arc bar concentric to the pivot of the tank and passing below said tank, a split guide on the bottom of the tank embracing the arc bar, and a clamp screw passing through the guide to clamp the same in adjusted position on the arc bar.

2. An actuating mechanism for grade indicators including a frame, a shaft supported in said frame, an arcuate tank having upstanding arms pivoted to the shaft, a second shaft journalled in said arms, gears connecting said shafts, a pendulum fixed to the second shaft and dipping into said tank, an arc bar carried by the frame and extending concentrically of the first shaft beneath said tank, a split guide on the bottom of the tank embracing the arc bar, and a screw passing through the guide to clamp the same in adjusted position on the bar.

3. In a grade indicator, a dial having grade indicia thereon, a pointer traversing the grade indicia, a shaft having said pointer fixed thereon, a plumb pendulum, adjustable means for dampening the movement of the pendulum, gearing connecting the pendulum and the shaft, said dampening means comprising a pivotally supported tank having a viscous liquid therein into which the pendulum dips, means to secure the tank in adjusted position on its pivot, the latter means comprising a stationary arc bar, a split guide on the tank embracing the arc bar, and means for clamping the same in adjusted position on the bar.

4. In a grade indicator, a dial having grade indicia thereon, a pointer traversing the grade indicia, a shaft having said pointer fixed thereon, a plumb pendulum, adjustable means for dampening the movement of the pendulum, gearing connecting the pendulum and the shaft, said dampening means comprising a pivotally supported tank having a viscous liquid therein into which the pendulum dips, means to secure the tank in adjusted positions on its pivot, the latter means comprising a stationary arc bar and a grip member mounted on the tank for engaging the arc bar at different points to hold the tank in different adjusted positions.

In testimony whereof I affix my signature.

RUDOLF F. KATOLIN.